(12) United States Patent  
Koseoglu et al.

(10) Patent No.: US 10,422,046 B2  
(45) Date of Patent: Sep. 24, 2019

(54) HYDROGEN PRODUCTION FROM AN INTEGRATED ELECTROLYSIS CELL AND HYDROCARBON GASIFICATION REACTOR

(71) Applicants: Omer Refa Koseoglu, Dhahran (SA); Jean Pierre Ballaguet, Dhahran (SA)

(72) Inventors: Omer Refa Koseoglu, Dhahran (SA); Jean Pierre Ballaguet, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 13/915,661

(22) Filed: Jun. 12, 2013

(65) Prior Publication Data

US 2013/0334060 A1 Dec. 19, 2013

Related U.S. Application Data

(60) Provisional application No. 61/659,206, filed on Jun. 13, 2012.

(51) Int. Cl.
    *C25B 1/10* (2006.01)
    *C10K 3/04* (2006.01)
    (Continued)

(52) U.S. Cl.
    CPC .............. *C25B 1/10* (2013.01); *C10G 49/007* (2013.01); *C10K 3/04* (2013.01); *C25B 1/04* (2013.01);
    (Continued)

(58) Field of Classification Search
    CPC ..................... C10J 2300/1684; C25B 1/04–12
    (Continued)

(56) References Cited

U.S. PATENT DOCUMENTS 4,081,337 A 3/1978 Spitzer  
4,160,479 A 7/1979 Richardson et al.  
(Continued)

FOREIGN PATENT DOCUMENTS

DE 102011112093 A1 12/2012  
EP 0066498 A1 12/1982

OTHER PUBLICATIONS

Hulteberg et al., "A Study of Combined Biomass Gasification and Electrolysis for Hydrogen Production", Int. Journal of Hydrogen Energy (2009), 34, pp. 772-782.

(Continued)

*Primary Examiner* — Brian W Cohen  
(74) *Attorney, Agent, or Firm* — Abelman, Frayne & Schwab

(57) ABSTRACT

An integrated process for hydrogen gas production includes:
a. operating a water electrolysis cell with an external source of electricity to produce oxygen and hydrogen;
b. optionally operating an air separation unit to produce additional oxygen for the process;
c. introducing a hydrocarbon feedstock into a membrane wall gasification reactor with an ash-forming material and steam, and oxygen from the electrolysis cell and, optionally, oxygen from the air separation unit to produce hot raw synthesis gas;
d. passing the hot raw synthesis gas from the gasification reactor to a steam-generating heat exchanger to produce steam and a cooled raw synthesis gas;
e. introducing the steam generated in the heat exchanger into a turbine to produce electricity to operate the electrolysis cell; and
f. recovering the hydrogen gas from the water electrolysis cell and, optionally, subjecting the synthesis gas to a (Continued)

water-gas shift reaction to increase the hydrogen content and recovering the hydrogen.

8 Claims, 9 Drawing Sheets

(51) Int. Cl.
    *C25B 1/04*     (2006.01)
    *C10G 49/00*     (2006.01)
    *C10J 3/48*     (2006.01)

(52) U.S. Cl.
    CPC ........ *C10J 3/485* (2013.01); *C10J 2300/1684* (2013.01); *Y02E 20/18* (2013.01); *Y02E 60/366* (2013.01); *Y02P 20/125* (2015.11); *Y02P 20/132* (2015.11)

(58) Field of Classification Search
    USPC .................................................. 205/628–639
    See application file for complete search history.

(56) References Cited

U.S. PATENT DOCUMENTS

| | | | |
|---|---|---|---|
| 4,173,254 A * | 11/1979 | Paull et al. | 165/134.1 |
| 4,205,963 A * | 6/1980 | Marion et al. | 48/197 R |
| 4,663,931 A | 5/1987 | Schiffers et al. | |
| 4,676,063 A | 6/1987 | Goebel et al. | |
| 4,900,429 A | 2/1990 | Richardson | |
| 5,271,813 A * | 12/1993 | Linkous | 205/628 |
| 5,416,245 A | 5/1995 | MacGregor et al. | |
| 5,958,365 A * | 9/1999 | Liu | 423/655 |
| 6,997,965 B2 | 2/2006 | Katayama | |
| 2008/0098654 A1 | 5/2008 | Cherry et al. | |
| 2008/0172941 A1 * | 7/2008 | Jancker | C10J 3/485 48/73 |
| 2008/0190026 A1 | 8/2008 | De Jong et al. | |
| 2008/0256860 A1 * | 10/2008 | Von Kossak-Glowczewski | 48/201 |
| 2010/0024300 A1 * | 2/2010 | Chornet et al. | 48/203 |
| 2011/0041740 A1 | 2/2011 | Reilly | |
| 2011/0083996 A1 * | 4/2011 | Shafi et al. | 208/50 |
| 2011/0200520 A1 * | 8/2011 | Ramkumar et al. | 423/656 |
| 2011/0259014 A1 * | 10/2011 | Miller et al. | 60/772 |
| 2012/0073292 A1 | 3/2012 | Koseoglu | |
| 2012/0149789 A1 * | 6/2012 | Greenbaum | 518/704 |

OTHER PUBLICATIONS

Pruschek et al., "Combined Cycle Power Plant with Integrated Coal Gasification, CO Shift and CO2 Washing", Energy Convers. Mgmt. (1995), vol. 36, No. 6-9, pp. 797-800.

International Search Report and Written Opinion dated Oct. 23, 2013 by the European Patent Office in counterpart International Application PCT/US2013/045296.

* cited by examiner

HYDROGEN PRODUCTION FROM AN INTEGRATED ELECTROLYSIS CELL AND HYDROCARBON GASIFICATION REACTOR

RELATED APPLICATIONS

This application claims priority to provisional patent application U.S. Ser. No. 61/659,206 filed Jun. 13, 2012, the contents of which are incorporated herein by reference.

BACKGROUND OF THE INVENTION

Field of the Invention

The present invention relates to processes for the production of hydrogen from an integrated water electrolysis cell and hydrocarbon gasification reactor.

Description of Related Art

Gasification is well known in the art and it is practiced worldwide with application to solid and heavy liquid fossil fuels, including refinery bottoms. The gasification process uses partial oxidation to convert carbonaceous materials, such as coal, petroleum, biofuel, biomass and other hydrocarbon-containing materials with oxygen at high temperature, i.e., greater than 800° C., into a synthesis gas ("syngas"), steam and electricity. The syngas consists of carbon monoxide and hydrogen and can be burned directly in internal combustion engines, or used in the manufacture of various chemicals, such as methanol via known synthesis processes, and to make synthetic fuels via the Fischer-Tropsch process.

For refining applications, the main process block is known as the Integrated Gasification Combined Cycle (IGCC), which converts the feedstock into hydrogen, power and steam. FIG. 1 shows the process flow diagram of a conventional IGCC system 100 of the prior art, which includes a feed preparation section 102, a gasification reactor 104, an air separation unit 180, a syngas quench and cooling unit 110, a water-gas shift reactor 120, an acid gas removal (AGR) and sulfur recovery unit (SRU) 130, a gas turbine 140, a heat recovery steam generator (HRSG) 150, and a steam turbine 160.

In a conventional IGCC, a feedstock is introduced via a feed line 101 to the feed preparation section 102. The prepared feedstock is then passed to the gasification reactor 104 with a predetermined amount of oxygen 103 produced from the air separation unit 180. The feedstock is partially oxidized in the gasification reactor 104 to produce a hot syngas 106 which is conveyed to the syngas quench and cooling unit 110. Hot syngas 106 is cooled with boiler feed water 156 to produce cooled syngas 114 and steam. A portion of the steam (steam 112) is used in the water-gas shift reactor 120 to produce shifted gas 122, and another portion of the steam (steam 116) is consumed in the heat recovery steam generator 150. Shifted gas 122 is treated in the AGR/SRU 130 to separate carbon dioxide 136, sulfur 138, and hydrogen syngas recovery 132. A portion of the hydrogen syngas recovery 132 (gas turbine feed 134) is passed to the gas turbine 140 with air feed 142 to produce electricity 144. High pressure discharge 146 from the gas turbine 140 is conveyed to the HRSG 150 to generate steam which is used in the steam turbine 160 to produce additional electricity 162.

The air separation unit 180 and most of the downstream processes utilize mature technologies with high on-stream reliability factors. However, the gasification reactor 104 has a relatively limited lifetime that can be as short as from 3 to 18 months, depending upon the characteristics of the feed and the design of the unit.

Three principal types of gasification reactor technologies are moving bed, fluidized bed and entrained-flow systems. Each of the three types can be used with solid fuels, but only the entrained-flow reactor has been demonstrated to efficiently process liquid fuels. In an entrained-flow reactor, the fuel, oxygen and steam are injected at the top of the gasifier through a co-annular burner. The gasification reaction usually takes place in a refractory-lined vessel which operates at a pressure of about 40 bars to 60 bars and a temperature in the range of from 1300° C. to 1700° C.

There are two types of gasifier wall construction: refractory and membrane. The gasifier conventionally uses refractory liners to protect the reactor vessel from corrosive slag, thermal cycling, and elevated temperatures that range from 1400° C. to 1700° C. The refractory wall is subjected to the penetration of corrosive components from the generation of the syngas and slag, and thus subsequent reactions in which the reactants undergo significant volume changes that result in strength degradation of the refractory materials. The replacement of refractory linings can cost several millions of dollars a year and several weeks of downtime for a given reactor. Up until now, the solution has been the installation of a second or parallel gasifier to provide the necessary continuous operating capability, but the undesirable consequence of this duplication is a significant increase in the capital costs associated with the unit operation.

On the other hand, membrane wall gasifier technology uses a cooling screen protected by a layer of refractory material to provide a surface on which the molten slag solidifies and flows downwardly to the quench zone at the bottom of the reactor. The advantages of the membrane wall reactor include reduced reactor dimensions as compared to other systems; an improved average on-stream time of 90%, as compared to an on-stream time of 50% for a refractory wall reactor; elimination of the need to have a parallel reactor to maintain continuous operation as in the case of refractory wall reactors; and the build-up of a layer of solid and liquid slag that provides self-protection to the water-cooled wall sections.

In a membrane wall gasifier, the build-up of a layer of solidified mineral ash slag on the wall acts as an additional protective surface and insulator to minimize or reduce refractory degradation and heat losses through the wall. Thus the water-cooled reactor design avoids what is termed "hot wall" gasifier operation, which requires the construction of thick multiple-layers of expensive refractories which will remain subject to degradation. In the membrane wall reactor, the slag layer is renewed continuously with the deposit of solids on the relatively cool surface. The solids that form the slag must be introduced in the hydrocarbon feed in whole or in part. Where the hydrocarbon feed contains insufficient or no ash forming material, it must be supplemented or provided entirely by a source of ash in a separate feed. Further advantages include short start-up/shut down times; lower maintenance costs than the refractory type reactor; and the capability of gasifying feedstocks with high ash content, thereby providing greater flexibility in treating a wider range of coals, petcoke, coal/petcoke blends, biomass co-feed, and liquid feedstocks.

There are two principal types of membrane wall reactor designs that are adapted to process solid feedstocks. One such reactor uses vertical tubes in an up-flow process equipped with several burners for solid fuels, e.g., petcoke. A second solid feedstock reactor uses spiral tubes and down-flow processing for all fuels. For solid fuels, a single burner having a thermal output of about 500 MWt has been developed for commercial use. In both of these reactors, the flow of pressurized cooling water in the tubes is controlled to cool the refractory and ensure the downward flow of the molten slag. Both systems have demonstrated high utility with solid fuels, but not with liquid fuels.

For the production of liquid fuels and petrochemicals, a key parameter is the mole ratio of hydrogen-to-carbon monoxide in the dry syngas. This ratio is usually between 0.85:1 and 1.2:1, depending upon the feedstock characteristics. Thus, additional treatment of the syngas is needed to increase this ratio up to 2:1 for Fischer-Tropsch applications through the water-gas shift reaction represented by $CO+H_2O \rightarrow CO_2+H_2$. In some cases, part of the syngas is burned together with some off gases in a combined cycle to produce electricity and steam. The overall efficiency of this process is between 44% and 48%.

Electrolysis of water is the decomposition of water into oxygen and hydrogen gas by passing an electric current through the water. FIG. 2 shows a schematic diagram of an electrochemical cell which has two electrodes: a cathode and an anode. The electrodes are placed in the water and externally connected with a power supply. At a certain critical voltage, hydrogen is produced at the cathode and oxygen is produced at the anode. The reactions proceed as follows:

$$2H^+(aq)+2e^- \rightarrow H_2(g) \text{ (cathode)} \quad (1)$$

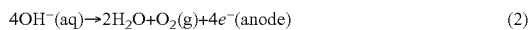

$$4OH^-(aq) \rightarrow 2H_2O+O_2(g)+4e^- \text{ (anode)} \quad (2)$$

The minimum necessary cell voltage for the start-up of electrolysis, $E°_{cell}$, is given under standard conditions, as represented by the following:

$$E^0_{Cell} = \frac{-\Delta G^0}{nF} \quad (3)$$

where $\Delta G°$ is the change in the Gibbs free energy under standard conditions;
n is the number of electrons transferred; and
F is Faraday's constant which is 96,485 C.

There are three types of water electrolyzers categorized by the types of electrolyte used: alkaline, proton exchange membrane and solid oxide. The most common type is the alkaline electrolyzer which can be either unipolar or bipolar. FIG. 3 is a schematic diagram of a unipolar electrolyzer of the prior art. The unipolar electrolyzer resembles a tank and has electrodes connected in parallel. A membrane or a diaphragm is placed between the cathode and anode, which separates the hydrogen and oxygen as the gases are produced, but allows the transfer of ions. The bipolar electrolyzer resembles a filter press. Bipolar electrolyzers consist of many cells, as many as 100-160, which are connected in series to the circuit. Each electrode, with the exception of the two terminal electrodes, functions as a cathode at one end and an anode at the other. Electrolysis cells are connected in series, and hydrogen is produced on one side of the cell and oxygen on the other side of the cell.

In general, the operating conditions for electrolysis plants with normal or slightly elevated pressure includes an electrolyte temperature in the range of from 70 to 90° C., a cell voltage in the range of from 1.85 to 2.05 V, a power consumption in the range of from 4 to 5 KWh/m³, and a hydrogen production at a purity of 99.8% or higher. Pressure electrolysis units operate at a pressure in the range of from 6 to 200 bars, and the operating pressure has no significant influence on the power consumption. Because of its high energy consumption and substantial capital investment, water electrolysis is currently used for only 4% of world hydrogen production.

It is also known that operation of the electrolysis cell at high temperatures improves the efficiency. This optional heating step can be used to advantage when a high temperature heat source is available to increase the cell operating temperature.

While both the gasification and water electrolysis processes are well developed and suitable for their intended purposes, their combination and applications in conjunction with upgrading crude oil and its fractions do not appear to have been developed.

The problem addressed by the present invention is therefore to provide a method for the economical production of hydrogen from an integrated water electrolysis cell and hydrocarbon gasification reactor.

SUMMARY OF THE INVENTION

The present invention broadly comprehends the production of hydrogen from an integrated water electrolysis cell and hydrocarbon gasification reactor.

In accordance with one embodiment, the integrated process for the production of hydrogen gas includes the steps of:

a. introducing water into an electrolysis cell and operating the electrolysis cell with an external source of electricity to produce oxygen and hydrogen;

b. introducing a hydrocarbon feedstock into a membrane wall gasification reactor with an external source of steam and optionally a source of ash, and the oxygen produced from the electrolysis cell;

c. subjecting the hydrocarbon feedstock to partial oxidation to produce a hot raw synthesis gas;

d. passing the hot raw synthesis gas to a steam generating heat exchanger to produce steam and a cooled raw synthesis gas;

e. introducing the steam into a turbine to produce electricity;

f. operating the electrolysis cell with the electricity produced from step (e); and g. recovering the hydrogen gas from the electrolysis cell.

In accordance with another embodiment, the process for the production of hydrogen gas includes the steps of:

a. introducing water into an electrolysis cell and operating the electrolysis cell with an external source of electricity to produce oxygen and hydrogen;

b. introducing air into an air separation unit to produce oxygen;

c. introducing a hydrocarbon feedstock into a membrane wall gasification reactor with an external source of steam and ash, and a combined oxygen stream composed of oxygen produced from the electrolysis cell and oxygen recovered from the air separation unit;

d. subjecting the hydrocarbon feedstock to partial oxidation to produce a hot raw synthesis gas;

e. passing the hot raw synthesis gas to a steam generating heat exchanger to produce steam and a cooled raw synthesis gas;

f. introducing the steam from the heat exchanger into a turbine to produce electricity;

g. operating the electrolysis cell with the electricity produced from step (f); and h. recovering the hydrogen gas from the electrolysis cell.

In accordance with additional embodiments, a process and apparatus for the production of hydrogen gas further includes a water-gas shift reaction vessel for subjecting the synthesis gas to the water-gas shift reaction represented by $CO+H_2O \rightarrow CO_2+H_2$, to thereby increase the volume of hydrogen in the shifted syngas.

Other aspects, embodiments, and advantages of the process of the present invention are discussed in detail below. Moreover, it is to be understood that both the foregoing information and the following detailed description are merely illustrative examples of various aspects and embodiments, and are intended to provide an overview or framework for understanding the nature and character of the claimed features and embodiments. The accompanying drawings are included to provide illustration and a further understanding of the various aspects and embodiments. The drawings, together with the remainder of the specification, serve to explain principles and operations of the described and claimed aspects and embodiments.

The economic advantages of the integrated process of the invention will vary with the local costs and availability of electricity, raw materials and process gases, e.g., oxygen and hydrogen. As will be apparent to one of ordinary skill in the art, the costs for engineering, design, construction, operation and maintenance of the water electrolysis unit are favorable when compared to those of an air separation plant.

BRIEF DESCRIPTION OF THE DRAWINGS

The foregoing summary, as well as the following detailed description will be best understood when read in conjunction with the attached drawings in which.

DETAILED DESCRIPTION OF THE PREFERRED EMBODIMENTS

Two embodiments for the production of hydrogen gas from an integrated water electrolysis cell and hydrocarbon gasification reactor will be described with reference to the schematic diagram of FIGS. 4 and 5.

Figure 1:
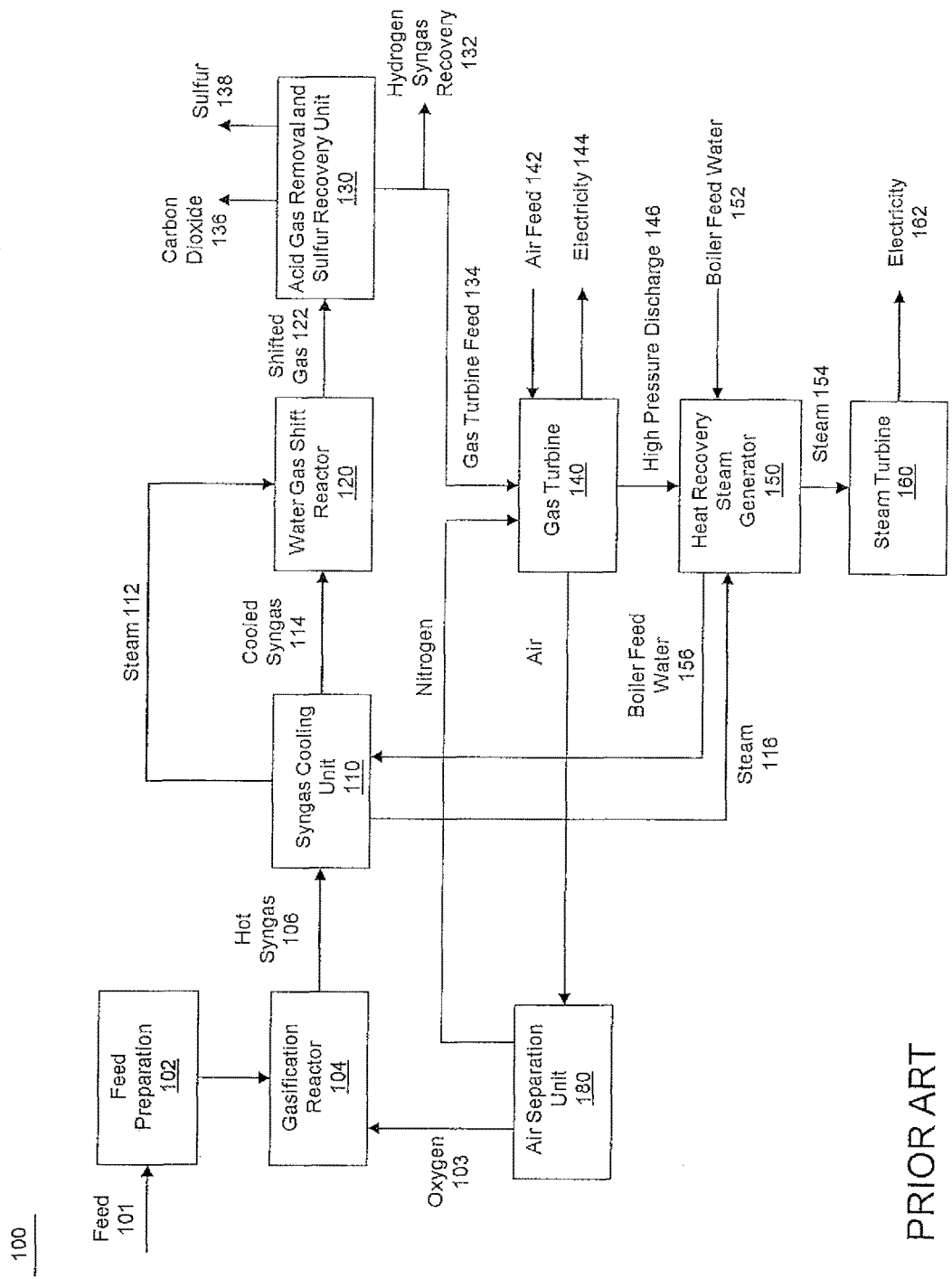
FIG. 1 is a schematic diagram of an integrated gasification-combined cycle process of the prior art.
Figure 2:
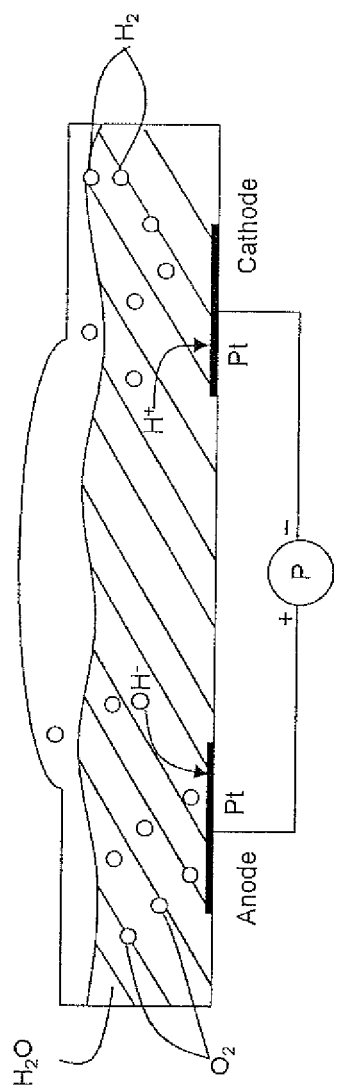
FIG. 2 is a schematic diagram of an electrochemical cell of the prior art.
Figure 3:
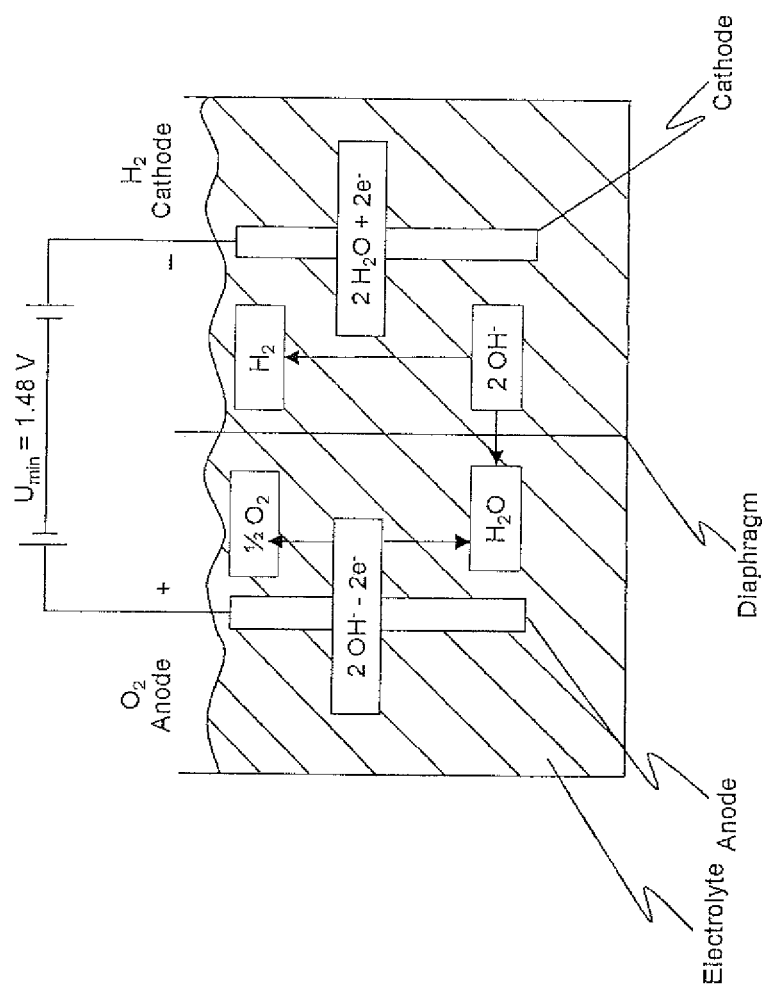
FIG. 3 is a schematic diagram of a unipolar electrolyzer or electrolysis cell of the prior art.
Figure 4:
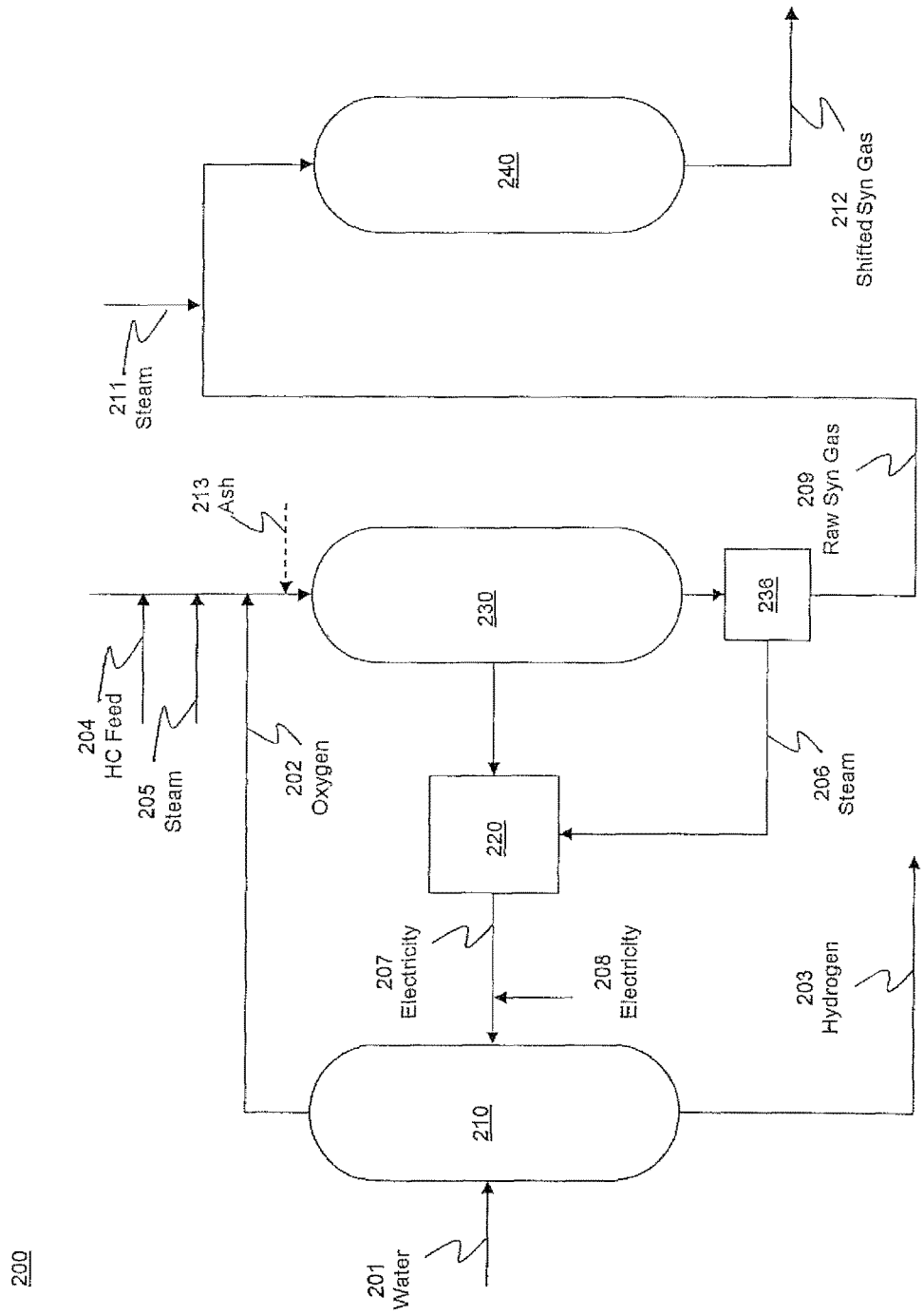
FIG. 4 is a schematic diagram of one embodiment of the process of the present invention for the production of hydrogen gas from an integrated water electrolysis cell and hydrocarbon gasification reactor.

Referring to FIG. 4, an integrated water electrolysis cell and hydrocarbon gasification reactor apparatus 200 includes an electrolysis cell 210, a turbine 220, a membrane wall gasification reactor 230, a heat exchanger 236, and a water-gas shift reaction vessel 240. Note that while the embodiment of apparatus 200 described herein includes a water-gas shift reaction vessel to enhance the output of hydrogen by conversion of some or all of the carbon monoxide in the syngas, alternative embodiments similar to apparatus 200 can be practiced without the water-gas shift reaction vessel.

Electrolysis cell 210 includes an inlet for receiving water, an outlet for discharging produced oxygen and an outlet for discharging produced hydrogen. Electrolysis cell 210 is initially operated using an external source of electricity 208. The energy requirement is then switched to the electricity 207 produced by turbine 220 using steam 206 generated from membrane wall gasification reactor 230. The energy requirement for electrolysis cell 210 may be supplemented by external source of electricity 208 in case the supply of electricity 207 is insufficient.

Membrane wall gasification reactor 230 includes an inlet for introducing a mixture of a hydrocarbon feedstock, a controlled amount of steam and optionally an ash-containing material, and oxygen produced by the electrolysis cell 210. Membrane wall gasification reactor 230 also includes an outlet for discharging hot raw syngas. Heat exchanger 236 includes an inlet for receiving hot raw syngas discharged from membrane wall gasification reactor 230, an outlet for discharging a cooled raw syngas and an outlet for discharging steam.

The optional water-gas shift reaction vessel 240 includes an inlet for receiving cooled raw syngas 209 discharged from heat exchanger 236, and a conduit for introducing a controlled amount of steam. Water-gas shift reaction vessel 240 also includes an outlet for discharging the hydrogen rich shifted syngas product.

In the practice of the method of this embodiment, water 201 is introduced into electrolysis cell 210 which is initially operated using an external source of electricity 208 to produce oxygen 202 and hydrogen 203. A hydrocarbon feedstock 204 is introduced as a pressurized feedstream into the membrane wall gasification reactor 230 along with a predetermined amount of steam 205 and ash 213, and oxygen 202 produced from electrolysis cell 210. The hydrocarbon feedstock 204 is partially oxidized in the membrane wall gasification reactor 230 to produce hydrogen and carbon monoxide in the form of a hot raw syngas.

Hot raw syngas is passed to the heat exchanger 236 to produce a cooled raw syngas 209. Steam 206 discharged from the heat exchanger 236 is passed to turbine 220 to produce electricity 207 for the sustained operation of electrolysis cell 210 without or with a limited requirement for external electricity 208.

In certain embodiments, at least a portion of the cooled raw syngas 209 is conveyed to the water-gas shift reaction vessel 240 with a predetermined amount of steam 211. Hydrogen production is increased through the water-gas shift reaction in the presence of steam represented by $CO+H_2O \rightarrow CO_2+H_2$. The content of carbon monoxide is reduced to less than 1 mole % after the water-gas shift reaction. A mixture of hydrogen, carbon dioxide, unreacted carbon monoxide and other impurities is discharged via an outlet as shifted syngas 212. High purity hydrogen gas is optionally recovered by a process such as pressure swing adsorption (PSA), or by use of membranes, absorption, adsorption, or a combination thereof.

Figure 5:
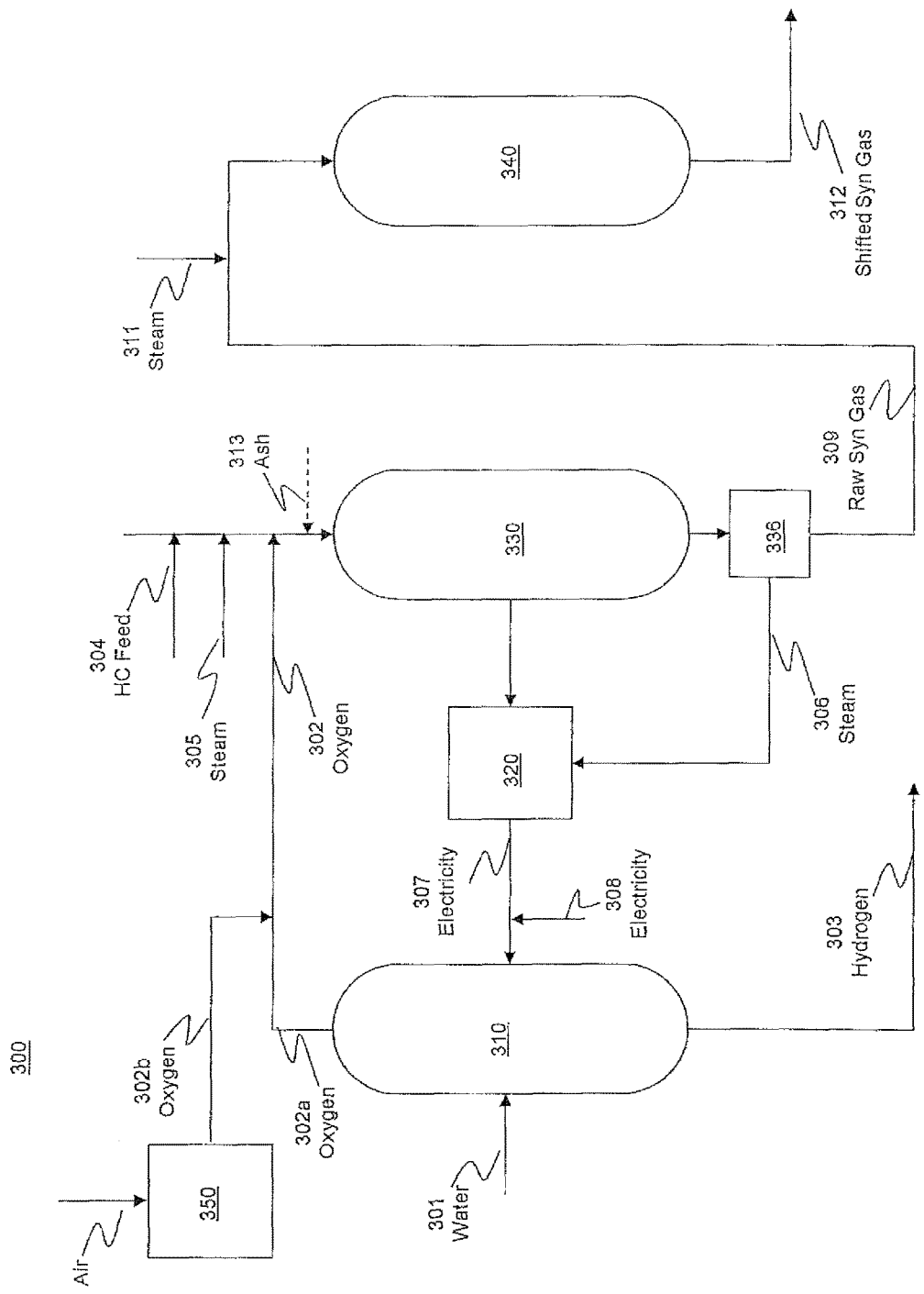
FIG. 5 is a schematic diagram of another embodiment of the process for the production of hydrogen gas from an integrated water electrolysis cell and hydrocarbon gasification reactor.

Referring now to FIG. 5, another embodiment of an integrated water electrolysis cell and hydrocarbon gasification reactor apparatus 300 is schematically illustrated. Apparatus 300 includes an electrolysis cell 310, a turbine 320, a membrane wall gasification reactor 330, a heat exchanger 336, a water-gas shift reaction vessel 340, and an air separation unit 350. Note that while the embodiment of apparatus 300 described herein includes a water-gas shift reaction vessel to enhance the output of hydrogen by conversion of some or all of the carbon monoxide in the syngas, alternative embodiments similar to apparatus 300 can be practiced without the water-gas shift reaction vessel.

Electrolysis cell 310 includes an inlet for receiving water, an outlet for discharging produced oxygen 302a and an outlet for discharging produced hydrogen 303. Electrolysis cell 310 is initial operated using an external source of electricity 308. The energy source is then at least partially switched to the electricity 307 produced by turbine 320 using steam 306 generated by hot syngas from membrane wall gasification reactor 330, while continuing supply the electrolysis cell 310 with the external source of electricity 308. This increases the oxygen output from the electrolysis cell 310, which improves the efficiency of hydrocarbon gasification in the membrane wall reactor 330. Air separation unit 350 includes an inlet for receiving air and an outlet for discharging separated oxygen 302b.

Membrane wall gasification reactor 330 includes an inlet for introducing a mixture of a hydrocarbon feedstock 304, a controlled amount of steam 305 and optionally an ash-containing material 313, and a combined oxygen stream 302 which composed of oxygen 302a produced from the electrolysis cell 310 and oxygen 302b recovered from air separation unit 350. Membrane wall gasification reactor 330 also includes an outlet for discharging hot raw syngas. Heat exchanger 336 includes an inlet for receiving hot raw syngas discharged from membrane wall gasification reactor 330, an outlet for discharging a cooled raw syngas and an outlet for discharging steam.

The optional water-gas shift reaction vessel 340 includes an inlet for receiving cooled raw syngas 309 discharged from heat exchanger 336, and a conduit for introducing a controlled amount of steam. Water-gas shift reaction vessel 340 also includes an outlet for discharging the hydrogen-rich shifted syngas product.

In the practice of the method of this embodiment, water 301 is introduced into electrolysis cell 310 which is initially operated using an external source of electricity 308 to produce oxygen 302a and hydrogen 303. A hydrocarbon feedstock 304 is introduced as a pressurized feedstream into the membrane wall gasification reactor 330 along with a predetermined amount of steam 305 and ash 313, and a combined stream of oxygen 302 which composed of oxygen 302a produced from electrolysis cell 310 and oxygen 302b recovered from air separation unit 350. The additional oxygen 302b increases the oxygen input to gasification reactor 330, which improves the efficiency of hydrocarbon oxidation.

The hydrocarbon feedstock 304 is partially oxidized in the membrane wall gasification reactor 330 to produce hydrogen and carbon monoxide in the form of a hot raw syngas. Hot raw syngas is passed to the heat exchanger 336 to produce a cooled raw syngas 309. Steam 306 discharged from heat exchanger 336 is passed to turbine 320 to produce electricity 307 for the sustained operation of electrolysis cell 310 without or with a reduced requirement for the externally supplied electricity 308.

In certain embodiments, at least a portion of the cooled raw syngas 309 is conveyed to the water-gas shift reaction vessel 340 with a predetermined amount of steam 311. Hydrogen production is increased through the water-gas shift reaction in the presence of steam represented by $CO+H_2O \rightarrow CO_2+H_2$. The content of carbon monoxide is reduced to less than 1 mole % after the water-gas shift reaction. A mixture of hydrogen, carbon dioxide, unreacted carbon monoxide and other impurities is discharged via an outlet as shifted syngas 312. High purity hydrogen gas is optionally recovered by a process such as pressure swing adsorption (PSA), or by use of membranes, absorption, adsorption, or a combination thereof.

Figure 6:
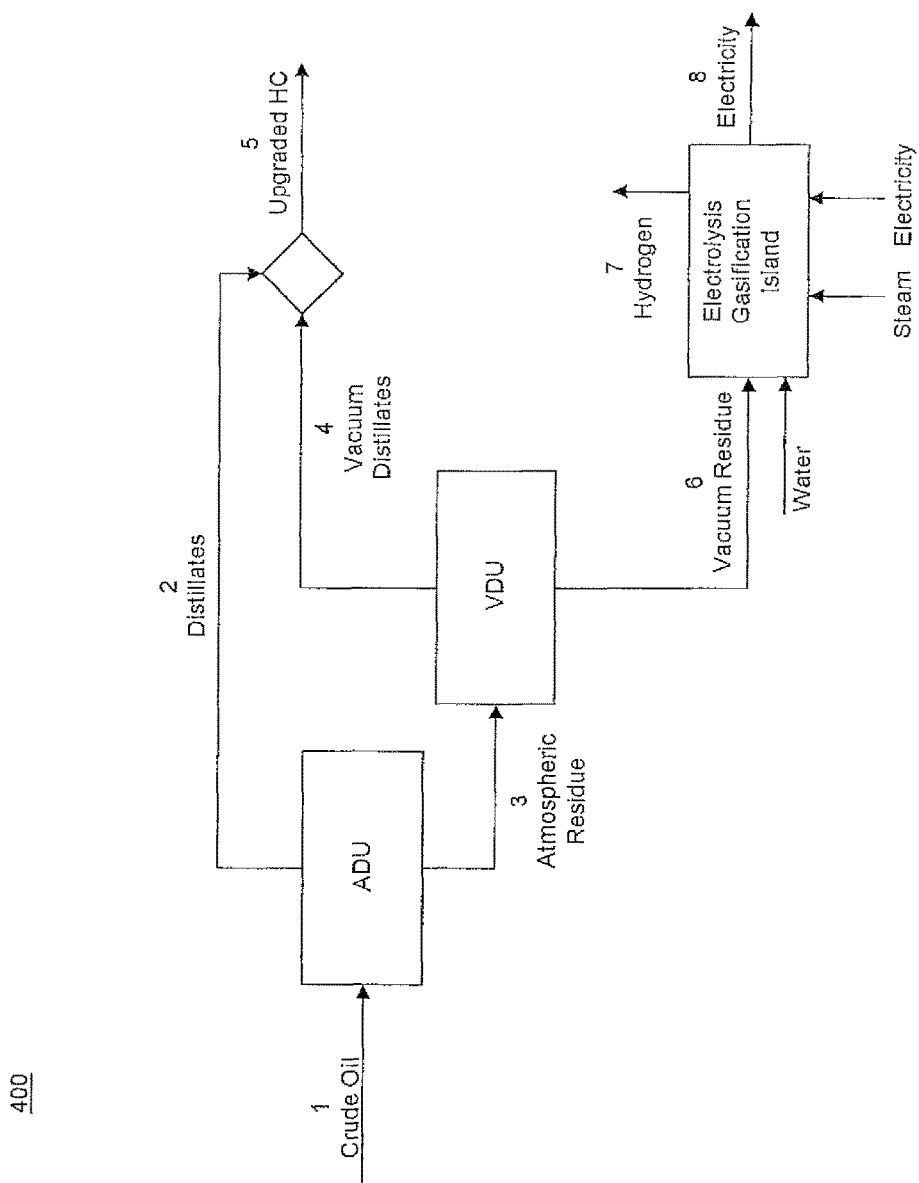
FIG. 6 is a schematic diagram of an integrated crude oil upgrading process for the production of combined distillates products, and the production of hydrogen gas from a vacuum residue feedstock.

FIGS. 6-9 illustrate applications of the integrated electrolysis and gasification unit in various crude oil upgrading processes. FIG. 6 is a schematic diagram of an integrated crude oil upgrading process and apparatus 400 for the production of combined distillates products, and the production of hydrogen gas from vacuum residue feedstock. Apparatus 400 includes an atmospheric distillation unit (ADU), a vacuum distillation unit (VDU) and an integrated water electrolysis cell and hydrocarbon gasification reactor as shown in FIG. 4 or 5. For simplicity of illustration in the drawings, the integrated water electrolysis cell and hydrocarbon gasification reactor apparatus is hereinafter referred to as "Electrolysis Gasification Island."

Referring to FIG. 6, crude oil 1 is introduced into the ADU to produce distillates 2 and an atmospheric residue 3. The atmospheric residue 3 is the passed to the VDU to produce vacuum distillates 4 and a vacuum residue 6. A combined distillates 5 is recovered containing distillates 2 and vacuum distillates 4. The vacuum residue 6 is introduced into the membrane wall gasification reactor as the feedstock to produce hydrogen gas as described above in connection with FIGS. 4 and 5.

Figure 7:
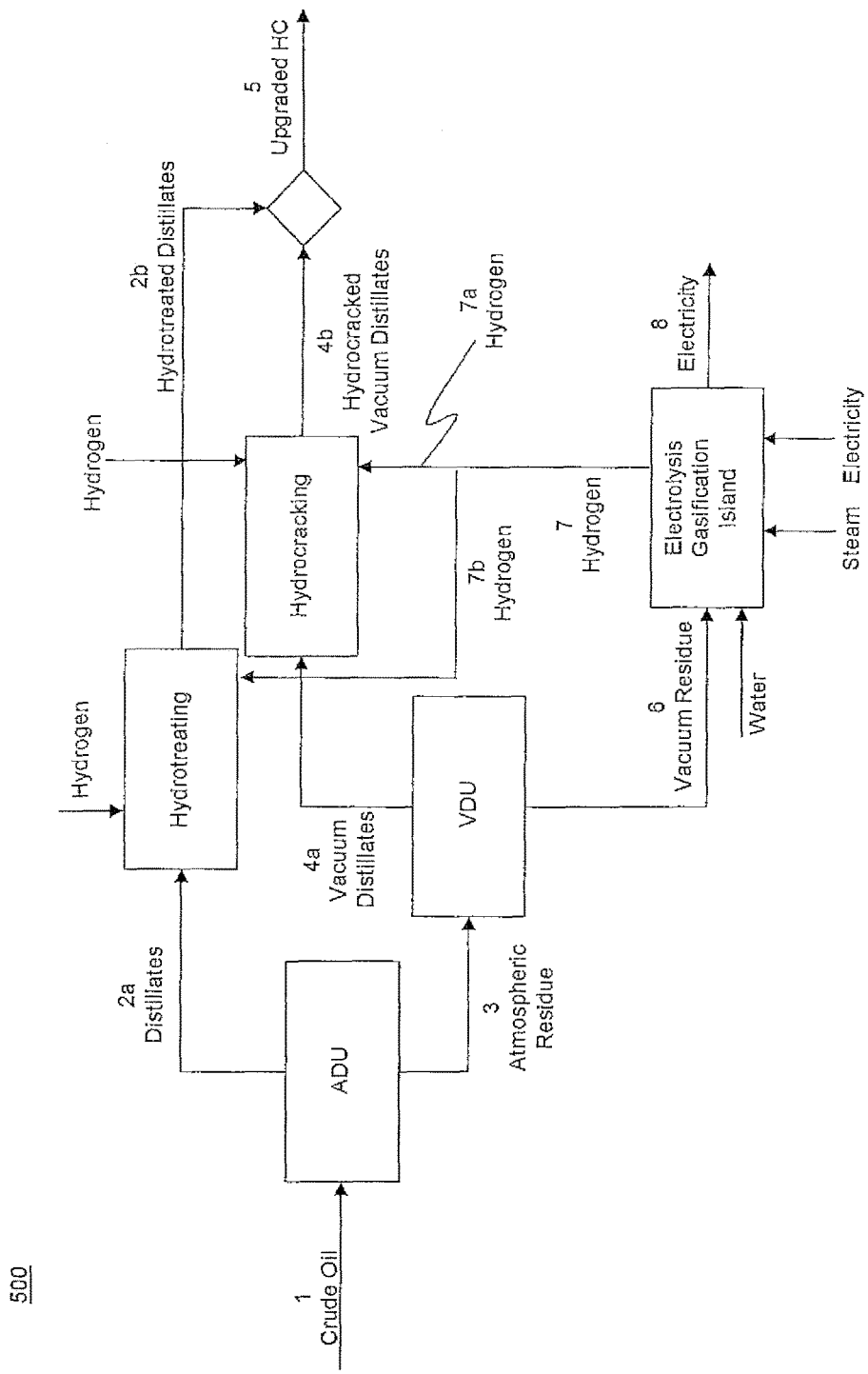
FIG. 7 is a schematic diagram of an integrated crude oil upgrading process for the production of upgraded hydrocarbon products, and the production of hydrogen gas from a vacuum residue feedstock.

FIG. 7 is a schematic diagram of an integrated crude oil upgrading process and apparatus 500 for the production of upgraded hydrocarbon products, and the production of hydrogen gas from vacuum residue feedstock. Apparatus 500 includes an ADU, a VDU, a hydrotreating unit, a hydrocracking unit and an Electrolysis Gasification Island. Crude oil 1 is introduced into the ADU to produce distillates 2a and an atmospheric residue 3. Distillates 2a are hydrotreated with an external source of hydrogen to produce hydrotreated distillates 2b. Atmospheric residue 3 is passed to the VDU to produce vacuum distillates 4a and vacuum residue 6. Vacuum distillates stream 4a is hydrocracked with an external source of hydrogen to produce hydrocracked vacuum distillates 4b. A combined upgraded hydrocarbon stream 5 is recovered from hydrotreated distillates 2b and hydrocracked vacuum distillates 4b.

Vacuum residue 6 is introduced into the membrane wall gasification reactor as the feedstock to produce hydrogen gas as described above in connection with FIGS. 4 and 5. Hydrogen produced from the Electrolysis Gasification Island is recovered as the hydrogen source for the hydrotreating unit and hydrocracking unit, thereby minimizing the external hydrogen requirement.

Figure 8:
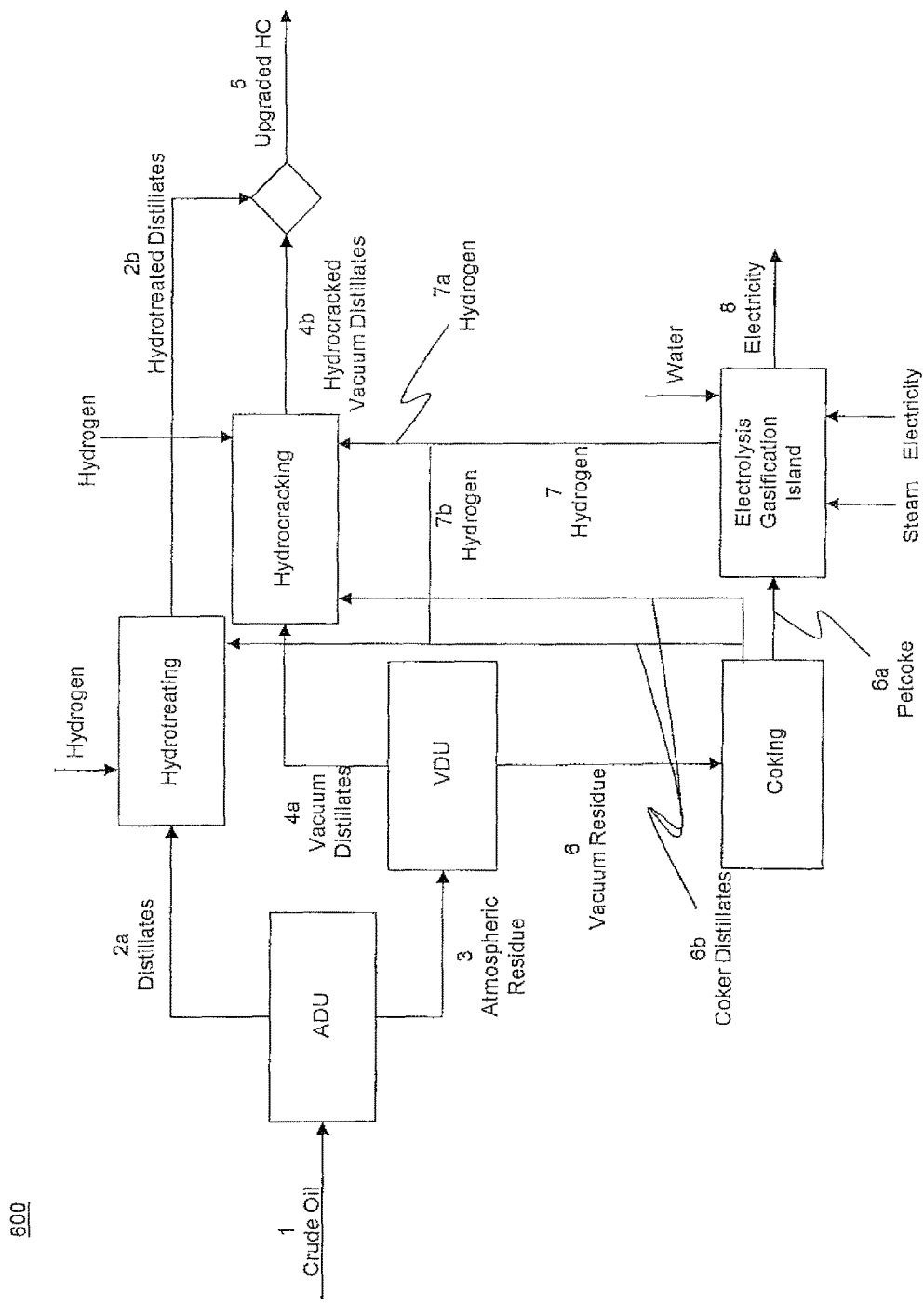
FIG. 8 is a schematic diagram of an integrated crude oil upgrading process for the production of upgraded hydrocarbon products, and the production of hydrogen gas from a petcoke feedstock.

FIG. 8 is a schematic diagram of an integrated crude oil upgrading process and apparatus 600 for the production of upgraded hydrocarbon products, and the production of hydrogen gas from a petroleum coke, or petcoke, feedstock. Apparatus 600 includes an ADU, a VDU, a hydrotreating unit, a hydrocracking unit, a coking unit and an Electrolysis Gasification Island. Crude oil 1 is introduced into the ADU to produce distillates 2a and an atmospheric residue 3. Distillates 2a are hydrotreated with an external source of hydrogen to produce hydrotreated distillates 2b. Atmospheric residue 3 is passed to the VDU to produce vacuum distillates 4a and a vacuum residue 6. Vacuum distillates 4a are hydrocracked with an external source of hydrogen to produce hydrocracked vacuum distillates 4b. A combined upgraded hydrocarbon stream 5 is recovered from hydrotreated distillates 2b and hydrocracked vacuum distillates 4b.

Vacuum residue 6 is introduced into the coking unit to produce coker distillates 6b and petcoke 6a. The coker distillates 6b are recycled to the steps of hydrotreating and hydrocracking. The petcoke 6a is conveyed to the membrane wall gasification reactor as the feedstock to produce hydrogen gas as described above in connection with FIGS. 4 and 5. Hydrogen produced from the Electrolysis Gasification Island is recovered as the hydrogen source for the hydrotreating unit and hydrocracking unit, thereby minimizing the hydrogen requirements from an external source.

Figure 9:
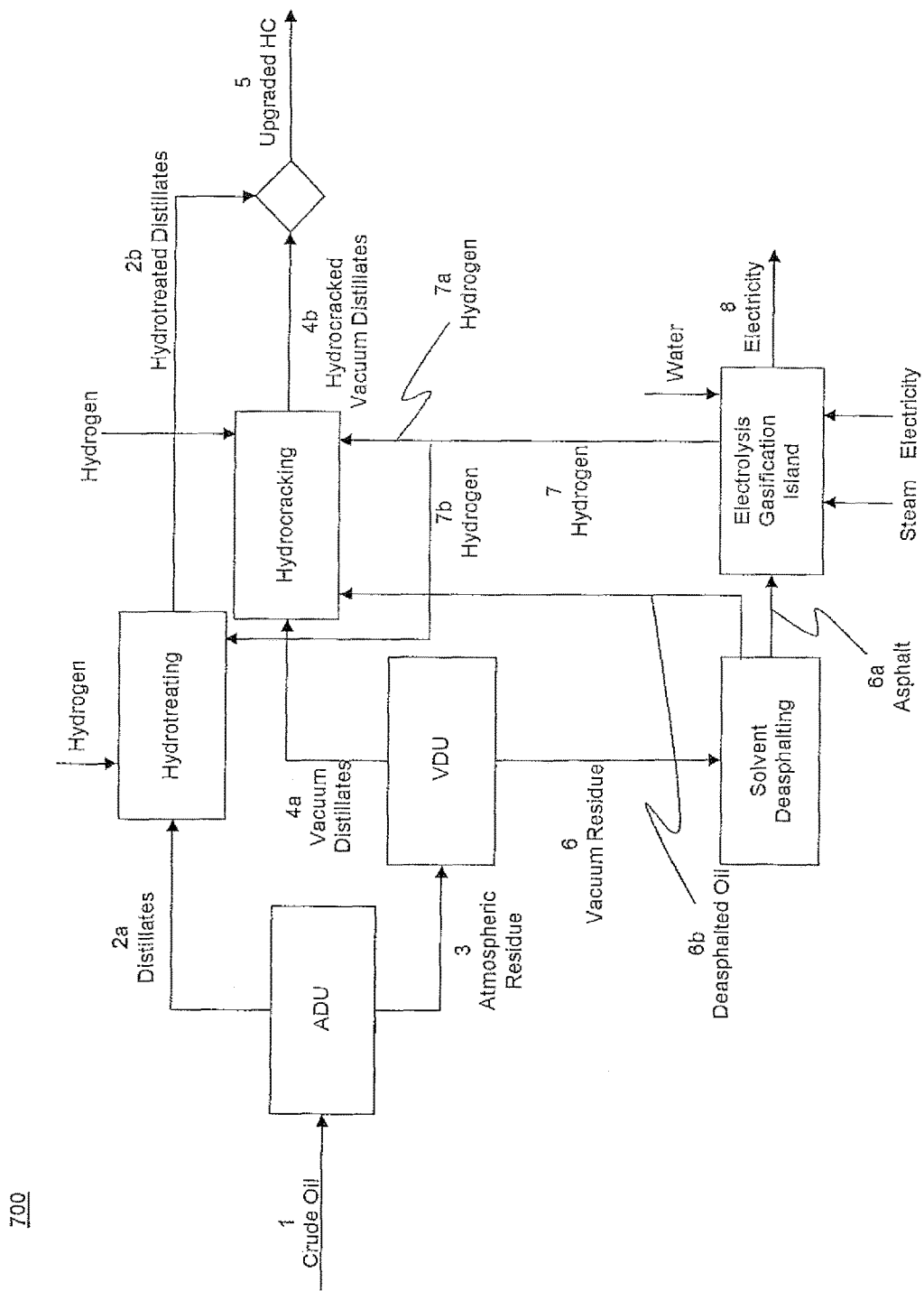
FIG. 9 is a schematic diagram of an integrated crude oil upgrading process for the production of upgraded hydrocarbon products, and the production of hydrogen gas from asphalt feedstock.

FIG. 9 is a schematic diagram of an integrated crude oil upgrading process and apparatus 700 for the production of an upgraded hydrocarbon stream, and the production of hydrogen gas from asphalt feedstock. Apparatus 700 includes an ADU, a VDU, a hydrotreating unit, a hydrocracking unit, a solvent deasphalting unit and an Electrolysis Gasification Island. Crude oil 1 is introduced into the ADU to produce distillates 2a and an atmospheric residue 3. Distillates 2a are hydrotreated with an external source of hydrogen to produce hydrotreated distillates 2b. Atmospheric residue 3 is passed to the VDU to produce vacuum distillates 4a and a vacuum residue 6. Vacuum distillates 4a are hydrocracked with an external source of hydrogen to produce hydrocracked vacuum distillates 4b. A combined upgraded hydrocarbon stream 5 is recovered from hydrotreated distillates 2b and hydrocracked vacuum distillates 4b.

Vacuum residue 6 is introduced into the solvent deasphalting unit to produce deasphalted oil 6b and asphalt 6a. Deasphalted oil 6b is recycled to the hydrocracking unit. Asphalt 6a is conveyed to the membrane wall gasification reactor as the feedstock to produce hydrogen gas as described above in connection with FIGS. 4 and 5. Hydrogen produced from the Electrolysis Gasification Island is recovered as a hydrogen source for the hydrotreating unit and hydrocracking unit to minimize the hydrogen requirement from the external source.

In general, the operating conditions for the membrane wall gasification reactor include a temperature in the range of from 900° C. to 1800° C.; a pressure in the range of from 20 bars to 100 bars; a mole ratio of oxygen-to-carbon content of the feedstock in the range of from 0.5:1 to 10:1, in certain embodiments from 1:1 to 5:1, and in further embodiments from 1:1 to 2:1; a mole ratio of steam-to-carbon content of the feedstock in the range of from 0.1:1 to 10:1, in certain embodiments from 0.1:1 to 2:1, and in further embodiments from 0.4:1 to 0.6:1.

In general, the operating conditions for the water electrolysis cell include a temperature in the range of from 10° C. to 70° C.; a pressure in the range of from 1 to 30 bars; and a voltage in the range of from 1 to 5 V.

The properties of the syngas subjected to the water-gas shift reaction are at a temperature in the range of from 150° C. to 400° C.; a pressure in the range of from 1 bar to 60 bars; and a mole ratio of water-to-carbon monoxide in the range of from 5:1 to 3:1.

The operating conditions for the coking, solvent deasphalting, hydrotreating and hydrocracking units are as follows:

TABLE 1

| Process Units | | Operating Conditions | |
|---|---|---|---|
| | | Operable Range | Preferred Range |
| Delayed Coking | | | |
| Temperature | ° C. | 425-650 | 450-510 |
| Pressure | Bar | 1-20 | 1-7 |
| Hydrotreating | | | |
| Temperature | ° C. | 300-400 | 320-380 |
| Pressure | Bar | 20-100 | 30-60 |
| LHSV | $h^{-1}$ | 0.5-10 | 1-2 |
| H2/Oil | SLt/Lt | 100-500 | 100-300 |
| Catalyst Support | | Alumina or Silica-Alumina | Alumina or Silica-Alumina |
| Catalyst Active Metals | | Group VI, VII or VIIIB | Co/Mo or Ni/Mo or Co/Ni/Mo |
| Hydrocracking | | | |
| Temperature | ° C. | 350-500 | 350-450 |
| Pressure | Bar | 50-200 | 80-150 |
| LHSV | $h^{-1}$ | 0.5-5 | 0.5-2 |
| H2/Oil | SLt/Lt | 500-2500 | 500-1000 |
| Catalyst Support | | Alumina or Silica-Alumina or Zeolites | Alumina or Silica-Alumina |
| Catalyst Active Metals | | Group VI, VII or VIIIB | Co/Mo or Ni/Mo or Co/Ni/Mo |
| Solvent Deasphalting | | | |
| Temperature | ° C. | below the solvent's critical temperature | below the solvent's critical temperature |
| Pressure | Bar | below the solvent's critical pressure | below the solvent's critical pressure |

TABLE 1-continued

| Process Units | | Operable Range | Preferred Range |
| --- | --- | --- | --- |
| | | Operating Conditions | |
| Solvents to oil Ratio | h$^{-1}$ | 1:20 to 20:1 | 1:5 to 5:1 |
| Adsorbent | | attapulgus clay, alumina, silica, activated carbon, spent zeolites, spent catalysts composed of alumina and silica alumina, and mixtures thereof. | attapulgus clay, alumina, silica, activated carbon, spent zeolites, spent catalysts composed of alumina and silica alumina, and mixtures thereof. |
| Adsorbent to Oil Ratio | | 20:0.1 W/W, and preferably 10:1 W/W | 5:0.1 W/W, and preferably 5:1 W/W |
| Adsorbent Surface area | m$^2$/g | 10-500 | 10-500 |
| Adsorbent Pore Size | °A | 10-5000 | 10-750 |
| Adsorbent pore volume | cc/g | 0.1-0.5 | 0.1-0.4 |

Distinct advantages are offered by the apparatus and processes described. Valuable hydrogen and oxygen gases and electricity can be efficiently produced for on-site refinery use. In particular, the oxygen produced by the water electrolysis cell is supplied to the gasification reactor, while electricity indirectly produced from the operation of the gasification reactor is provided to power the water electrolysis cell. The need for a costly air separation unit is fully or partially eliminated. The process of the present invention can be practiced to particular advantage when hydrogen is needed for hydroprocessing and natural gas is not available. This is usually the case in refineries when full conversion is required to meet the demand for cleaner and lighter products, such as gasoline, jet fuel, and diesel transportation fuels.

Example

The apparatus described in FIG. 7 is used to illustrate the present invention. A one hundred thousand barrels per day (KBPD) of Arab light crude oil, the properties of which are shown in Table 2 below, was introduced as a feedstock into an ADU and the atmospheric residue passed to a VDU.

TABLE 2

Properties of Arab Light Crude Oil

| Name | Crude Oil |
| --- | --- |
| SG | 0.869 |
| API Gravity | 31.4 |
| Sulfur, W % | 1.94 |
| Nitrogen, ppmw | 842 |
| MCR, W % | 5.36 |
| C5-Asphalthenes, W % | 2.45 |
| Ni, ppmw | 5 |
| V, ppmw | 17 |

The distillates and vacuum gas oil fractions were obtained from the crude oil and passed to the respective hydrotreating and hydrocracking units to remove the impurities. The vacuum residue fraction was sent to the Electrolysis Gasification Island to produce hydrogen needed for the hydrotreating and hydrocracking steps. Material balances are given in Table 3. The stream numbers referred to in Table 3 correspond to the streams in FIG. 7.

TABLE 3

Material Balance

| Stream | Stream # | Flow, Kg/h |
| --- | --- | --- |
| Crude Oil | 1 | 331,442 |
| Distillates | 2a | 184,945 |
| Hydrotreated Distillates | 2b | 186,374 |
| Atmospheric Residue | 3 | 146,497 |
| Vacuum Distillates | 4a | 76,342 |
| Hydrotreated Vacuum Distillates | 4b | 77,747 |
| Vacuum Residue | 6 | 70,155 |
| Hydrogen | 7 | 9,075 |
| Hydrogen to Hydrocracking | 7a | −1,469 |
| Hydrogen To Hydrotreating | 7b | −1,405 |
| Power (MW) | 8 | 1,439 |

Table 4 summarizes the material balance within the Electrolysis Gasification Island. The stream numbers referred to in Table 4 correspond to the streams in FIG. 4.

TABLE 4

Gasification Island Material Balance

| Stream # | Stream # | Flow, Kg/h |
| --- | --- | --- |
| Water | 201 | 81,107 |
| Oxygen | 202 | 72,095 |
| Hydrogen | 203 | 9,075 |
| Vacuum Residue | 204 | 70,155 |
| Power (MW) | 207 | 1,944,640 |

The gasification reactor was operated at 1045° C. and 28 bars. The ratio of steam-to-carbon was 1:1 by weight. The ratio of oxygen-to-carbon was 1:1 by weight. The water electrolysis cell was operated at 25° C. and atmospheric pressure.

The method and system of the present invention have been described above and in the attached drawings; however, modifications derived from this description will be apparent to those of ordinary skill in the art and the scope of protection for the invention is to be determined by the claims that follow.

The invention claimed is:

1. An integrated refinery crude oil upgrading and gasification process comprising:
   a. introducing a crude oil feedstock into an atmospheric distillation unit to produce atmospheric distillate and atmospheric residue;
   b. recovering the atmospheric residue from the atmospheric distillation unit and introducing it as a feedstock into a vacuum distillation unit to produce vacuum distillate and a vacuum residue;

c. introducing water into an electrolysis cell and operating the electrolysis cell with an external source of electricity to produce oxygen and hydrogen;
d. recovering the vacuum residue from the vacuum distillation unit and introducing the vacuum residue as a feedstock into a membrane wall partial oxidation gasification reactor with an external source of steam, an ash-forming material, and the oxygen produced by the electrolysis cell and optionally supplemental oxygen produced by an air separation unit, so that the total content of the ash-forming material in the feedstock to the membrane wall partial oxidation gasification reactor is in the range of from 2 W % to 10 W % of the total weight of the feedstock;
e. subjecting the vacuum residue and the ash-forming material comprising the feedstock to partial oxidation to produce a hot raw synthesis gas and slag to coat walls of the membrane wall partial oxidation gasification reactor;
f. passing the hot raw synthesis gas to a steam generating heat exchanger to produce steam and a cooled raw synthesis gas;
g. introducing the steam from the heat exchanger into a turbine to produce electricity;
h. operating the electrolysis cell with the electricity produced in step (g);
i. recovering the hydrogen from the electrolysis cell;
j. recovering the atmospheric distillate from the atmospheric distillation unit; and
k. recovering the vacuum distillate from the vacuum distillation unit;
wherein the vacuum residue recovered from the vacuum distillation unit has an insufficient amount of ash to coat the walls of the membrane wall partial oxidation gasification reactor without the addition of the ash-forming material as part of the feedstock into the membrane wall partial oxidation gasification reactor being subjected to partial oxidation.

2. The process of claim 1, further comprising mixing the recovered atmospheric distillate with the recovered vacuum distillate to produce an upgraded hydrocarbon stream.

3. The process of claim 1 in which the recovered atmospheric distillate is introduced into a hydrotreater and the recovered vacuum distillate is introduced into a hydrocracker and the hydrogen recovered from the electrolysis cell is introduced into either or both of the hydrotreater and the hydrocracker.

4. An integrated refinery crude oil upgrading and gasification process comprising:
a. introducing a crude oil feedstock into an atmospheric distillation unit to produce atmospheric distillate and atmospheric residue;
b. recovering the atmospheric residue from the atmospheric distillation unit and introducing it as a feedstock into a vacuum distillation unit to produce vacuum distillate and a vacuum residue;
c. recovering the atmospheric distillate from the atmospheric distillation unit and introducing it as a feedstock into a hydrotreating unit;
d. recovering the vacuum distillate from the vacuum distillation unit and introducing it as a feedstock into a hydrocracking unit;
e. introducing water into an electrolysis cell and initially operating the electrolysis cell with an external source of electricity to produce oxygen and hydrogen;
f. recovering hydrogen from the electrolysis cell and introducing it into either or both of the hydrotreating unit and the hydrocracking unit;
g. recovering the vacuum residue from the vacuum distillation unit and introducing it as a feedstock into a coking unit to produce coke and coker distillate;
h. recovering the coke from the coking unit and introducing it as a feedstock into a membrane wall partial oxidation gasification reactor with an external source of steam, an ash-forming material, and the oxygen produced by the electrolysis cell and optionally supplemental oxygen produced by an air separation unit,
so that the total content of the ash-forming material in the feedstock to the membrane wall partial oxidation gasification reactor is in the range of from 2 W % to 10 W % of the total weight of the feedstock;
i. subjecting the coke and the ash-forming material comprising the feedstock to partial oxidation to produce a hot raw synthesis gas and slag to coat walls of the membrane wall partial oxidation gasification reactor;
j. passing the hot raw synthesis gas to a steam generating heat exchanger to produce steam and a cooled raw synthesis gas;
k. introducing the steam from the heat exchanger into a turbine to produce electricity;
l. operating the electrolysis cell with the electricity produced in step (k); and
m. recovering coker distillate from the coking unit;
wherein the coke recovered from the coking unit has an insufficient amount of ash to coat the walls of the membrane wall partial oxidation gasification reactor without the addition of the ash-forming material as part of the feedstock into the membrane wall partial oxidation gasification reactor being subjected to partial oxidation.

5. The process of claim 4 in which the coker distillate is introduced into either or both of the hydrotreating unit and the hydrocracking unit.

6. An integrated refinery crude oil upgrading and gasification process comprising:
a. introducing a crude oil feedstock into an atmospheric distillation unit to produce atmospheric distillate and atmospheric residue;
b. recovering the atmospheric residue from the atmospheric distillation unit and introducing it as a feedstock into a vacuum distillation unit to produce vacuum distillate and a vacuum residue;
c. recovering the atmospheric distillate from the atmospheric distillation unit and introducing it as a feedstock into a hydrotreating unit;
d. recovering the vacuum residue from the vacuum distillation unit and introducing it as a feedstock into a solvent deasphalting unit to produce asphalt bottoms and deasphalted oil;
e. recovering the vacuum distillate from the vacuum distillation unit and introducing it as a feedstock into a hydrocracking unit;
f. introducing water into an electrolysis cell and operating the electrolysis cell with an external source of electricity to produce oxygen and hydrogen;
g. recovering the asphalt bottoms from the solvent deasphalting unit and introducing the asphalt bottoms as a feedstock into a membrane wall partial oxidation gasification reactor with steam from an external source, an ash-forming material, and the oxygen produced by the electrolysis cell and optionally, supplemental oxygen produced by an air separation unit, so that the total ash content of the ash-forming material in the feedstock to the membrane wall partial oxidation gasification reactor is in the range of from 2 W % to 10 W % of the total weight of the feedstock;

h. recovering hydrogen from the electrolysis cell and introducing it into either or both of the hydrotreating unit and the hydrocracking unit;

i. subjecting the asphalt bottoms and the ash-forming material comprising the feedstock to partial oxidation to produce a hot raw synthesis gas and slag to coat walls of the membrane wall partial oxidation gasification reactor;

j. passing the hot raw synthesis gas to a steam generating heat exchanger to produce steam and a cooled raw synthesis gas;

k. introducing the steam from the heat exchanger into a turbine to produce electricity;

l. operating the electrolysis cell with the electricity produced in step (k); and m. recovering the deasphalted oil stream from the solvent deasphalting unit;

wherein the asphalt bottoms recovered from the solvent deasphalting unit have an insufficient amount of ash to coat the walls of the membrane wall partial oxidation gasification reactor without the addition of the ash-forming material as part of the feedstock into the membrane wall partial oxidation gasification reactor being subjected to partial oxidation.

7. The process of claim 6 in which the recovered deasphalted oil stream is introduced into the hydrocracking unit.

8. The process of claim 1, 4 and 6, in which the ash-forming material is mixed with a liquid hydrocarbon feedstock upstream of the membrane wall gasification reactor.

* * * * *